(12) United States Patent
Rood

(10) Patent No.: US 7,121,596 B2
(45) Date of Patent: Oct. 17, 2006

(54) CLIP-ON BRUSH GUARD

(75) Inventor: Robert R. Rood, Durhamville, NY (US)

(73) Assignee: Robert Rood, Durhamville, NY (US)

( * ) Notice: Subject to any disclaimer, the term of this patent is extended or adjusted under 35 U.S.C. 154(b) by 0 days.

(21) Appl. No.: 10/667,300

(22) Filed: Aug. 2, 2004

(65) Prior Publication Data

US 2006/0022471 A1 Feb. 2, 2006

(51) Int. Cl.
*B60R 19/52* (2006.01)

(52) U.S. Cl. .................... 293/115; 180/68.6; 37/241

(58) Field of Classification Search ............... 293/115; 180/68.6; 37/231, 241
See application file for complete search history.

(56) References Cited

U.S. PATENT DOCUMENTS

| 4,099,760 | A | * | 7/1978 | Mascotte et al. | ........... 293/115 |
|---|---|---|---|---|---|
| 4,962,599 | A | * | 10/1990 | Harris | ................. 37/266 |
| 6,056,308 | A | * | 5/2000 | Harrison | ............ 280/416.1 |
| 6,290,271 | B1 | * | 9/2001 | Geisler | .................. 293/115 |
| 6,682,111 | B1 | * | 1/2004 | Houseman et al. | ..... 293/115 |
| 6,685,245 | B1 | * | 2/2004 | Houseman et al. | ..... 293/115 |

* cited by examiner

*Primary Examiner*—Dennis H. Pedder

(57) ABSTRACT

My invention attaches to trucks with snowplows. When the truck owner takes the snowplow off of the vehicle, my brush guard clips on to the truck side push plates remaining on the truck after the snowplow has been removed. To use the snowplow again, pull the pins on the brush guard slide it off and drive up to the snowplow and reattach snowplow without any tools required.

This process consists of two easy steps. Slide the brush guard onto the snowplow push plates until the holes line up. Twist and pull the spring loaded pins to (1) engage pins. To remove brush guard pull and twist pins ¼ turn until retaining key holds (10) pins open and slide brush guard off.

1 Claim, 4 Drawing Sheets

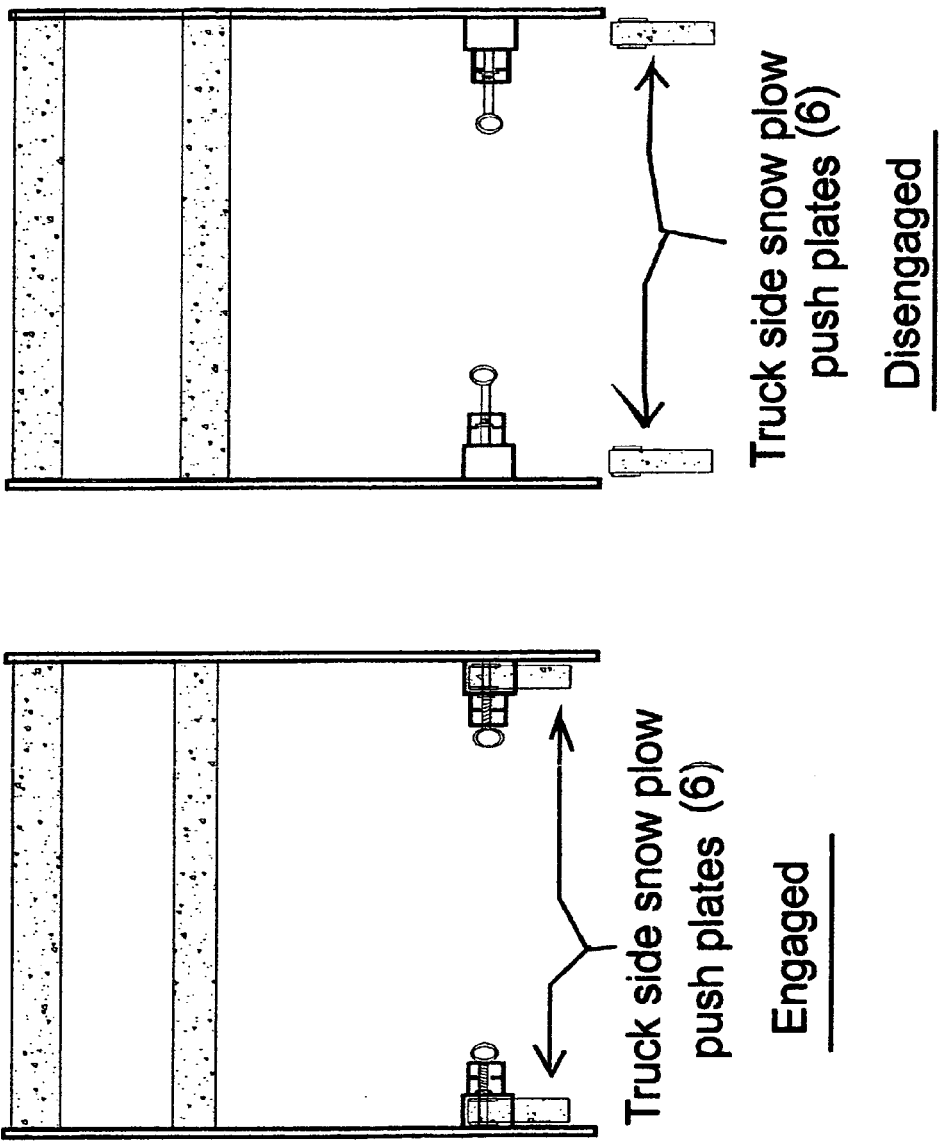

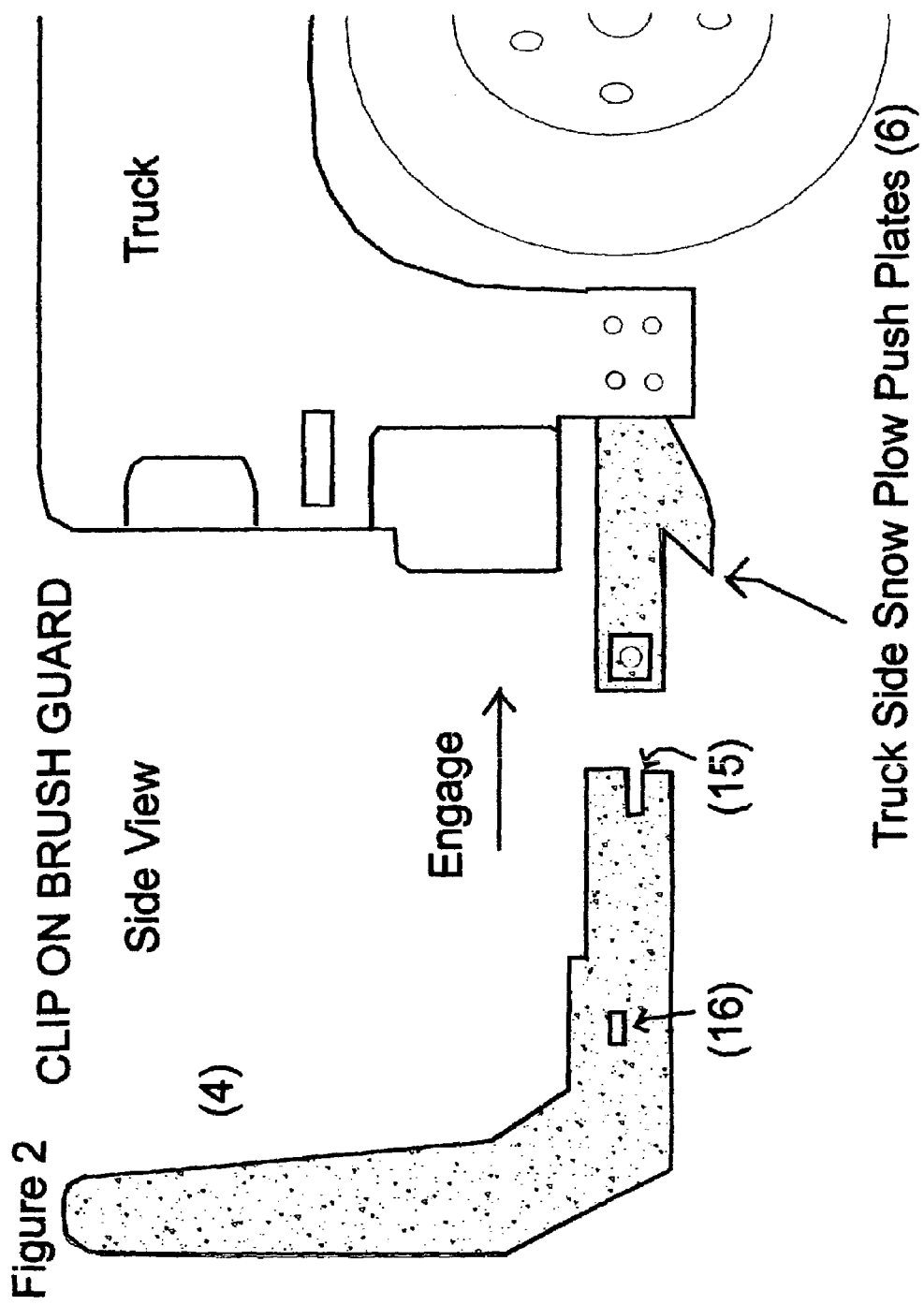

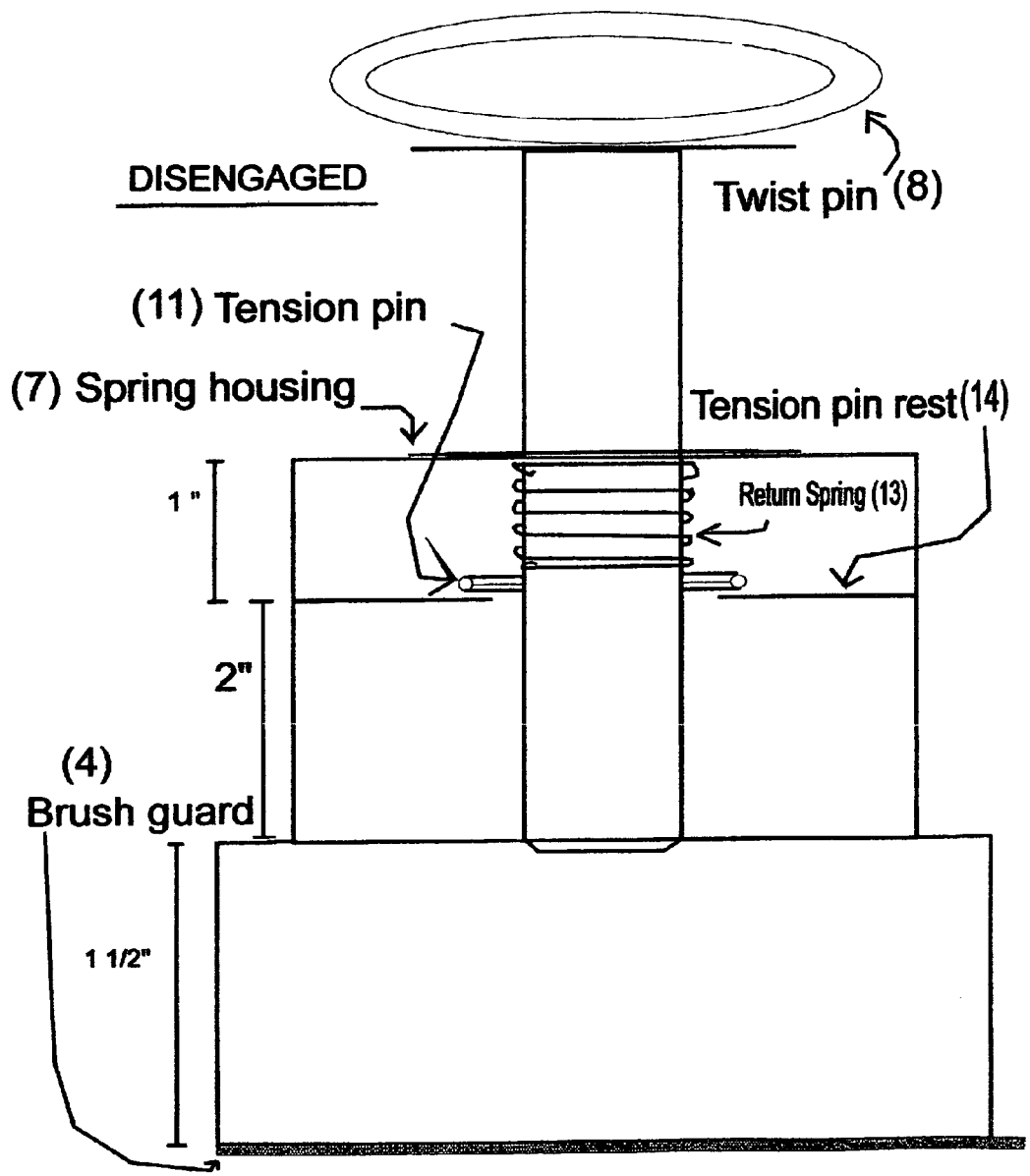

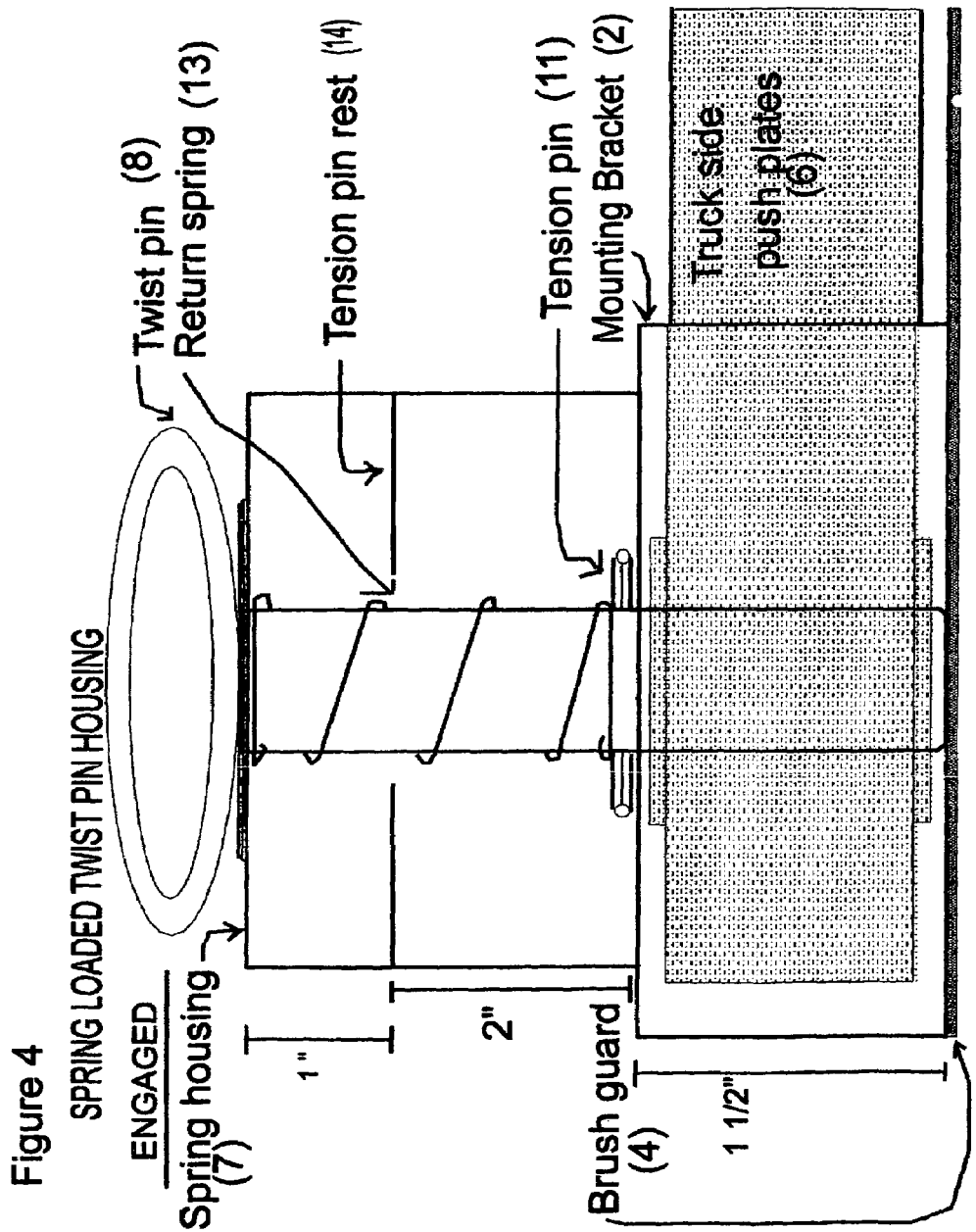

CLIP-ON BRUSH GUARD

BACKGROUND

The Brush guard is designed to fit any vehicle with a snow plow, whether it is prior to quick-mount systems, meaning the old style, wherein the plow frame stays on the truck or today's style where the plow frame comes off the truck with the plow and what you are left with on your truck is two push plates or brackets to receive the plow and frame. These brackets are very hard to remove and are made to stay on your truck even in warm weather. This makes for some unsightly pieces of metal protruding from your truck in a world where appearance is everything. I designed the brush guard to improve the appearance of the metal brackets and protect the grill and headlights of the vehicle.

Some notable features of the brush guard are steel tubing that make up cross pieces with one quarter inch steel side plates. The total width of the brush guard will vary depending on what make and model of snowplow and the height will be determined by the vehicle. The receiver part of the brush guard (the bottom of the brush guard that clips onto the snow plow brackets) clips on the truck using two spring loaded connecting pins. When the brush guard is put into place you turn the pins and the brush guard is now mounted on your vehicle. There are two thumb screws, one on each side on the bottom of the brush guard receiver. These screws are to be tightened by hand to minimize movement of the brush guard once mounted on the vehicle. The clip-on brush guard will also come with pre-drilled holes for headlight guards and fog lights. Color selection will be determined by the vehicle.

BRIEF DESCRIPTION OF THE DRAWINGS

FIG. 1. Is two front views of the brush guard, one engaged one disengaged.

FIG. 2. Is the Side view of the brush guard and the truck side snow plow push plates.

FIG. 3. Is the blow up of the Twist pin and the bracket system in the disengaged position.

FIG. 4. Is the blow up of the Twist pin and the bracket system in the engaged position.

DESCRIPTION

The twist pin is a hitch pin with a tension pin (11) about half way to retain the return spring (13). The tension pin protrudes from the hitch pin on both sides to retain the return spring and to hold the twist pin on the tension pin rest (14) in the disengaged position (10). The twist pin in it's engaged position (1) slides through the center of the spring housing (7) and the mounting bracket (2) to be received by the side place of the brush guard (4), as shown in FIG. 4. The aforementioned side plate (4) is one continuous piece forming the side of the brush guard with a hole to receive the twist pin. The side plate rises up in front of the truck grille (3) and protrudes back towards the front wheels of truck to be received by the snow plow bracket (6) to take up movement in brush guard (15) when the guard is on the truck, as shown in FIG. 2.

A second box is created when the spring housing (7) is attached to the mounting bracket (2). The spring housing (7) houses the return spring (13) and tension pin (11). The tension pin allows the return spring to be compressed, as shown in FIG. 3.

Inside the spring housing (7) there are two tabs creating the tension pin rest (14). This rest allows the twist pin (8) to stay open or disengaged (10) to allow the brush guard to be removed or mounted by keeping the twist pin out of the way. The process to disengage the twist pin (8) is as follows, pull and twist the pin ¼ turn, pull the pin past the tension pin rest and turn back ¼ turn while resting the tension pin (11) on the tension pin rest (14). This holds the twist pin (8) in the disengaged position (10) and out of the way, as shown in FIG. 3.

The brush guard mounting bracket (2) consists of one piece of (C) channel with a 1" hole (16) to receive a twist pin welded to a side plate (4). An end piece is welded to one end of (C) channel creating a five sided box. The open end receives the truck side push plate. Welded to the side of mounting bracket is another five sided piece of metal with a hole to receive the twist pin and retain the return spring. This spring housing (7) has two metal tabs opposite of each other creating the tension pin rest (14). The tension pin rest is utilized to hold the twist pin in a disengaged position (10) by resting the tension pin on top of these tabs while compressing the return spring, as shown in FIG. 3.

To move the tension pin past the tension pin rest, the twist pin must be turned ¼ turn in either direction pulled past tension pin rest while compressing the return spring. When this action has been achieved, the twist pin can be turned back ¼ turn in the opposite direction of the first action and the tension pin will rest on the tension pin rest, as shown in FIG. 3.

To engage the twist pin, pull back on the twist pin, turn ¼ turn either direction and release the twist pin. The Twist pin with the tension on the return spring will return to the engaged position, going completely through the spring housing, snow plow push plate, mounting bracket, and to be received by the hole in the brush guard side plate, as shown in FIG. 4.

What is claimed is:

1. A Brush Guard designed to be used on trucks with snowplow push plates comprising:
    L-shaped side plates connected by tubing cross pieces;
    a C-channel welded to an inside surface of each of the side plates at its open end, forming a closed cross section with the side plate;
    a spring housing mounted on an inside surface of each C-channel forming a second closed cross section;
    a spring loaded quarter turn fastener mounted to the spring housing with a rest surface within the spring housing;
    wherein the push plates are received within the C-channel closed cross sections with the quarter turn fasteners in a retracted position abutting the rest surface and wherein the quarter turn fasteners are released to engage the side plates to retain the Brush Guard in position.

* * * * *